US011118802B2

(12) United States Patent
Xu et al.

(10) Patent No.: US 11,118,802 B2
(45) Date of Patent: Sep. 14, 2021

(54) INDOOR ENVIRONMENTAL WEIGHTED PREFERENCE MANAGEMENT

(71) Applicant: Carrier Corporation, Palm Beach Gardens, FL (US)

(72) Inventors: Ke Xu, Germantown, MD (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/631,588

(22) PCT Filed: Jul. 19, 2018

(86) PCT No.: PCT/US2018/042888
§ 371 (c)(1),
(2) Date: Jan. 16, 2020

(87) PCT Pub. No.: WO2019/018645
PCT Pub. Date: Jan. 24, 2019

(65) Prior Publication Data
US 2020/0182499 A1 Jun. 11, 2020

Related U.S. Application Data

(60) Provisional application No. 62/535,424, filed on Jul. 21, 2017.

(51) Int. Cl.
F24F 11/30 (2018.01)
F24F 11/64 (2018.01)
(Continued)

(52) U.S. Cl.
CPC .............. *F24F 11/30* (2018.01); *F24F 11/58* (2018.01); *F24F 11/61* (2018.01); *F24F 11/64* (2018.01);
(Continued)

(58) Field of Classification Search
CPC .. F24F 11/30; F24F 11/64; F24F 11/65; F24F 11/58; F24F 11/61; F24F 2120/12; F24F 2120/14; F24F 2110/10; G05B 15/02
(Continued)

(56) References Cited

U.S. PATENT DOCUMENTS 5,924,486 A    7/1999  Ehlers et al.
6,145,751 A   11/2000  Osman
(Continued)

FOREIGN PATENT DOCUMENTS

CN    101553697 A    10/2009
CN    104121663 A    10/2014
(Continued)

OTHER PUBLICATIONS

A. Barbato, et al., Home Energy Saving through a User Profiling System based on Wireless Sensors, BuildSys'09, Nov. 3, 2009, 6 pages.
(Continued)

*Primary Examiner* — Rocio Del Mar Perez-Velez
*Assistant Examiner* — Christopher W Carter
(74) *Attorney, Agent, or Firm* — Cantor Colburn LLP (57) ABSTRACT

A method and system for indoor environmental weighted preference management are provided. The method includes determining, by a processor of a weighted preference processing system, a plurality of occupant indoor environmental setting preferences for a plurality of users at a location and a complaint history of the users. The processor of the weighted preference processing system determines one or more weighted set points for at least one building system operable to adjust an indoor environment at the location based on the occupant indoor environmental setting preferences for the users as weighted with respect to the complaint history of the users. One or more control devices of the at
(Continued)

least one building system are operated based on the one or more weighted set points.

14 Claims, 5 Drawing Sheets

(51) Int. Cl.
| | |
|---|---|
| *F24F 11/65* | (2018.01) |
| *F24F 11/58* | (2018.01) |
| *F24F 11/61* | (2018.01) |
| *G05B 15/02* | (2006.01) |
| *F24F 120/12* | (2018.01) |
| *F24F 120/14* | (2018.01) |
| *F24F 110/10* | (2018.01) |

(52) U.S. Cl.
CPC .............. *F24F 11/65* (2018.01); *G05B 15/02* (2013.01); *F24F 2110/10* (2018.01); *F24F 2120/12* (2018.01); *F24F 2120/14* (2018.01)

(58) Field of Classification Search
USPC ........................................................ 700/276
See application file for complete search history.

(56) References Cited

U.S. PATENT DOCUMENTS

| | | | |
|---|---|---|---|
| 6,216,956 B1 | 4/2001 | Ehlers et al. | |
| 6,754,504 B1 | 6/2004 | Reed | |
| 6,990,335 B1 | 1/2006 | Shamoon et al. | |
| 7,436,292 B2 | 10/2008 | Rourke et al. | |
| 7,565,225 B2 | 7/2009 | Dushane et al. | |
| 7,904,209 B2 | 3/2011 | Podgorny et al. | |
| 8,180,492 B2 | 5/2012 | Steinberg | |
| 8,239,922 B2 | 8/2012 | Sullivan et al. | |
| 8,510,255 B2 | 8/2013 | Fadell et al. | |
| 8,538,456 B2 | 9/2013 | Moton, Jr. et al. | |
| 8,630,741 B1 | 1/2014 | Matsuoka et al. | |
| 8,694,165 B2 | 4/2014 | Smith et al. | |
| 8,950,686 B2 | 2/2015 | Matsuoka | |
| 9,020,647 B2 | 4/2015 | Johnson | |
| 9,298,197 B2 | 3/2016 | Matsuoka et al. | |
| 9,423,779 B2 | 8/2016 | Agarwal | |
| 9,477,239 B2 | 10/2016 | Bergman et al. | |
| 9,500,377 B2 | 11/2016 | Viswanathan | |
| 9,535,411 B2 | 1/2017 | Wei et al. | |
| 10,505,751 B2 | 12/2019 | Casilli | |
| 2003/0103075 A1 | 6/2003 | Rosselot | |
| 2005/0097905 A1 | 5/2005 | Kwon et al. | |
| 2008/0281472 A1 | 11/2008 | Podgorny et al. | |
| 2010/0070101 A1 | 3/2010 | Benes et al. | |
| 2010/0262298 A1 | 10/2010 | Johnson et al. | |
| 2010/0318226 A1 | 12/2010 | Augusto et al. | |
| 2011/0190953 A1 | 8/2011 | Park et al. | |
| 2011/0238222 A1 | 9/2011 | Nikovski et al. | |
| 2012/0023225 A1 | 1/2012 | Imes et al. | |
| 2013/0231792 A1 | 9/2013 | Ji et al. | |
| 2013/0274940 A1 | 10/2013 | Wei et al. | |
| 2013/0310987 A1 | 11/2013 | Sobek et al. | |
| 2014/0222210 A1* | 8/2014 | Agarwal .............. | G05B 19/048 700/275 |
| 2014/0277765 A1 | 9/2014 | Karimi et al. | |
| 2014/0316581 A1 | 10/2014 | Fadell et al. | |
| 2014/0316582 A1 | 10/2014 | Berg-Sonne et al. | |
| 2014/0365017 A1 | 12/2014 | Hanna et al. | |
| 2015/0088272 A1 | 3/2015 | Drew | |
| 2015/0088786 A1 | 3/2015 | Anandhakrishnan | |
| 2015/0160673 A1 | 6/2015 | Vasylyev | |
| 2015/0168002 A1 | 6/2015 | Plitkins et al. | |
| 2015/0247646 A1 | 9/2015 | Song et al. | |
| 2015/0330645 A1 | 11/2015 | Speranzon et al. | |
| 2015/0338117 A1 | 11/2015 | Henneberger et al. | |
| 2016/0054023 A1 | 2/2016 | Baker et al. | |
| 2016/0069585 A1 | 3/2016 | Shrubsole et al. | |
| 2016/0085248 A1 | 3/2016 | Gordon et al. | |
| 2016/0123617 A1 | 5/2016 | Vega | |
| 2016/0131383 A1 | 5/2016 | Zhao et al. | |
| 2016/0139582 A1 | 5/2016 | Matsuoka et al. | |
| 2016/0201934 A1 | 7/2016 | Hester et al. | |
| 2017/0030603 A1 | 2/2017 | Barooah et al. | |
| 2017/0038753 A1 | 2/2017 | Shah et al. | |
| 2017/0074534 A1 | 3/2017 | Turner | |
| 2017/0075510 A1 | 3/2017 | Bentz et al. | |
| 2017/0123440 A1 | 5/2017 | Mangsuli et al. | |
| 2017/0191695 A1 | 7/2017 | Bruhn et al. | |
| 2017/0205105 A1* | 7/2017 | Adam .................. | F04D 27/004 |
| 2017/0211837 A1 | 7/2017 | Gupta et al. | |
| 2020/0200422 A1 | 6/2020 | Xu et al. | |
| 2020/0201271 A1 | 6/2020 | Xu et al. | |

FOREIGN PATENT DOCUMENTS

| | | |
|---|---|---|
| CN | 105160519 A | 12/2015 |
| CN | 205229864 U | 5/2016 |
| CN | 205351662 U | 6/2016 |
| CN | 106094942 A | 11/2016 |
| CN | 205692073 U | 11/2016 |
| CN | 106534088 A | 3/2017 |
| JP | 2010133665 A | 6/2010 |
| JP | 2017089967 A | 5/2017 |
| WO | 2005024311 A1 | 3/2005 |
| WO | 2014051632 A1 | 4/2014 |
| WO | 2014084832 A2 | 6/2014 |
| WO | 2014182621 A1 | 11/2014 |
| WO | 2016025802 A1 | 2/2016 |
| WO | 2017078941 A1 | 5/2017 |
| WO | 2017120262 A1 | 7/2017 |

OTHER PUBLICATIONS

A. Hang-yat Lam, et al., An Occupant-participatory Approach for Thermal Comfort Enhancement and Energy Conservation in Buildings, e-Energy'14, Jun. 11-13, 2014, 11 pages.
Alarm.com: Geolocation + Sensors + Learning = Really Smart Thermostat, retrieved from the Internet: http://www.alarm.com/about/media/MediaGeneric.aspx?cmid=179, May 31, 2017, 2 pages.
International Application No. PCT/US2018/042863 International Search Report and Written Opinion dated Oct. 16, 2018, 18 pages.
International Application No. PCT/US2018/042868 International Search Report and Written Opinion dated Oct. 4, 2018, 13 pages.
International Application No. PCT/US2018/042888 International Search Report and Written Opinion dated Oct. 17, 2018, 13 pages.
L. Klein, et al. Coordinating occupant behavior for building energy and comfort management using multi-agent systems, Published in Automation in Construction, Mar. 2012, vol. 22, pp. 525-536.
T. Nguyen, et al., Energy intelligent buildings based on user activity: A survey, Energy and Buildings 56 (2013) pp. 244-257.
CN Application No. 201880049005 First Office Action dated Mar. 3, 2021, 16 pages.

* cited by examiner

INDOOR ENVIRONMENTAL WEIGHTED PREFERENCE MANAGEMENT

BACKGROUND

The subject matter disclosed herein generally relates to the field of building systems, and more particularly to weighted occupant preference tracking and control of building systems.

Building occupants can have specific preferences for indoor environmental conditions, such as temperature, humidity, noise level, indoor air pollutant level, for example, $CO_2$, or illuminance level. Set points for shared indoor spaces, such as within commercial buildings, are typically set using a thermostat with set points regulated according to a pre-determined schedule. The pre-determined schedule is typically set up by a facility manager, and the occupants of the indoor environment may not be provided with control access to adjust the set points.

BRIEF SUMMARY

According to one embodiment, a method of indoor environmental weighted preference management is provided. The method includes determining, by a processor of a weighted preference processing system, a plurality of occupant indoor environmental setting preferences for a plurality of users at a location and a complaint history of the users. The processor of the weighted preference processing system determines one or more weighted set points for at least one building system operable to adjust an indoor environment at the location based on the occupant indoor environmental setting preferences for the users as weighted with respect to the complaint history of the users. One or more control devices of the at least one building system are operated based on the one or more weighted set points.

In addition to one or more of the features described above, or as an alternative, further embodiments may include accessing a positioning system to determine the position of the users at the location.

In addition to one or more of the features described above, or as an alternative, further embodiments may include determining a staying time of each of the users at the location.

In addition to one or more of the features described above, or as an alternative, further embodiments may include determining the one or more weighted set points as a function of the staying time of each of the users at the location.

In addition to one or more of the features described above, or as an alternative, further embodiments may include where a first weighting factor is applied based on the staying time and a second weighting factor is applied based on the complaint history for each of the users staying at the location longer than a pre-defined minimum staying time.

In addition to one or more of the features described above, or as an alternative, further embodiments may include applying a greater weight to the occupant indoor environmental setting preferences of the users having a longer staying time and to the users having a greater number of complaints as compared to other users at the location in determining each weighted set point of the one or more weighted set points.

In addition to one or more of the features described above, or as an alternative, further embodiments may include repeating the determining of the one or more weighted set points at a predetermined interval of time, or repeating the determining of the one or more weighted set points when an occupant entry event or an occupant exit event is detected at the location.

In addition to one or more of the features described above, or as an alternative, further embodiments may include providing the one or more weighted set points to a building automation system.

In addition to one or more of the features described above, or as an alternative, further embodiments may include adjusting the one or more weighted set points to match the occupant indoor environmental setting preferences for a single user based on determining that only the single user is at the location.

In addition to one or more of the features described above, or as an alternative, further embodiments may include setting each of the one or more weighted set points to a default value based on determining that the location is unoccupied by any of the users.

According to an embodiment, a weighted preference processing system for indoor environmental weighted preference management is provided that includes a processor and a memory including computer-executable instructions that, when executed by the processor, cause the processor to perform operations. The operations include determining a plurality of occupant indoor environmental setting preferences for a plurality of users at a location and a complaint history of the users, and determining one or more weighted set points for at least one building system operable to adjust an indoor environment at the location based on the occupant indoor environmental setting preferences for the users as weighted with respect to the complaint history of the users. One or more control devices of the at least one building system are operated based on the one or more weighted set points.

Technical effects of embodiments of the present disclosure include determining weighted occupant indoor environmental setting preferences and adjusting building systems based upon the preferences.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
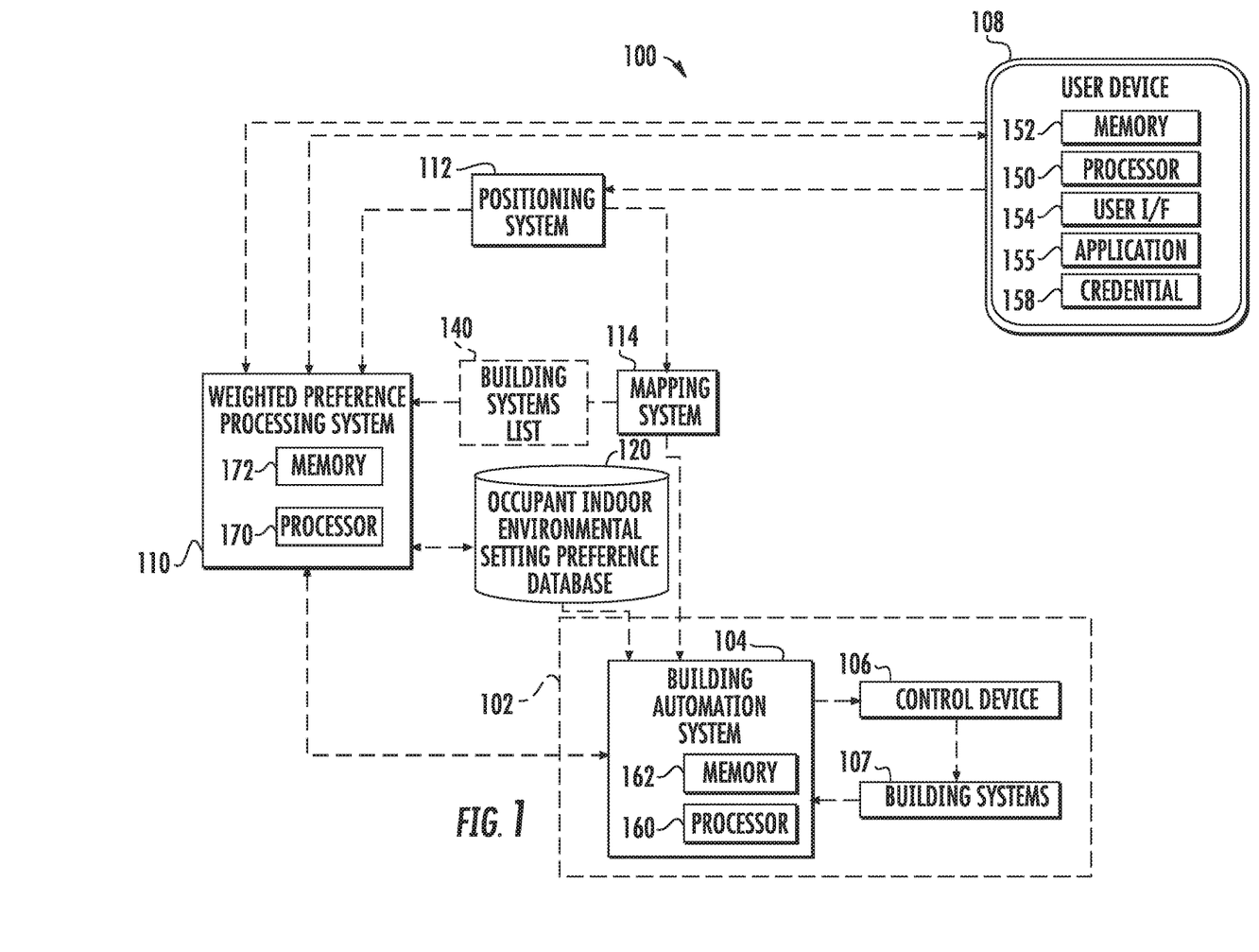
FIG. 1 illustrates a schematic view of a building control system, in accordance with an embodiment of the disclosure.

FIG. 1 depicts a building control system 100 in an example embodiment. The building control system 100 may be located partially or entirely within a building 102, and includes a building automation system 104 operable to command at least one control device 106 with at least one control setting for one or more building systems 107. The building control system 100 can also include a weighted preference processing system 110 operable to interface with at least one user device 108, a positioning system 112, a mapping system 114, and the building automation system 104. In some embodiments, the weighted preference processing system 110 provides a secure interface between the user device 108 and the building automation system 104. In alternate embodiments, user device 108 directly interfaces with the building automation system 104. Although depicted separately, the building automation system 104, user device 108, weighted preference processing system 110, positioning system 112, and/or mapping system 114 can be combined in various combinations/sub-combinations or be further distributed between additional systems (not depicted). In some embodiments, the building 102 may be a building or a collection of buildings that may or may not be physically located near each other. The building 102 may include any number of floors.

In embodiments, the user device 108 may be a computing device such as a desktop computer. The user device 108 may also be a mobile computing device that is typically carried by a person, such as, for example a phone, personal digital assistance (PDA), smart watch, tablet, laptop, etc. The user device 108 may also be two separate devices that are synced together such as, for example, a cellular phone and a desktop computer synced over an internet connection. The user device 108 may include a processor 150, memory 152, and a user interface 154 as shown in FIG. 1. The processor 150 can be any type or combination of computer processors, such as a microprocessor, microcontroller, digital signal processor, application specific integrated circuit, programmable logic device, and/or field programmable gate array. The memory 152 is an example of a non-transitory computer readable storage medium tangibly embodied in the user device 108 including executable instructions stored therein, for instance, as firmware. The user device 108 is configured to store a unique credential 158 that may be shared with various components of the building control system 100 to establish a user identifier associated with a user of the user device 108. In a non-limiting example, the user device 108 may belong to an employee and/or resident of the building 102. The user device 108 may also include an application 155. Embodiments disclosed herein may operate through the application 155 installed on the user device 108.

Similar to the user device 108, the building automation system 104 includes a processor 160 and memory 162, and the weighted preference processing system 110 includes a processor 170 and memory 172. Although not depicted in FIG. 1, it will be understood that other components of the building control system 100 can also include a processor and memory as described herein, such as within control device 106, positioning system 112, mapping system 114, and the like. The processor (e.g., processor 160, 170) can be any type or combination of computer processors, such as a microprocessor, microcontroller, digital signal processor, application specific integrated circuit, programmable logic device, and/or field programmable gate array. The memory (e.g., memory 162, 172) is an example of a non-transitory computer readable storage medium tangibly embodied in or operably connected to the path determination system including executable instructions stored therein, for instance, as firmware. Various communication protocols can be implemented to establish one-way and/or two-way communication within the building control system 100 using, for instance, wired and/or wireless links.

The positioning system 112 is configured to determine a location (i.e., current position) of the user of the user device 108. The location can include (x, y, z) coordinates of the user device 108 on a map. The (x, y, z) coordinates may translate to a latitude, a longitude, and an elevation. The positioning system 112 may use various methods in order to determine the location of the user, such as, for example, GPS, Bluetooth triangulation, Wi-Fi triangulation, cellular signal triangulation, or any other location determination method known to one of skill in the art. The positioning system 112 is configured to transmit the current position of the user device 108 to the user device 108 (i.e., location of the user) and at least one of the weighted preference processing system 110 and the mapping system 114. The weighted preference processing system 110 and the mapping system 114 can be configured to receive the location of the user from the positioning system 112. As an alternative or in addition to the positioning system 112, a badge-based access and entry system can be used to determine occupant location.

The mapping system 114 is configured to store the (x, y, z) coordinates of control devices 106, building systems 107, and/or various features of the building 102. When the mapping system 114 is provided with the current position of a user device 108, the mapping system 114 is configured determine a building systems list 140 in response to the current position of the user device 108. The building systems list 140 can identify which building systems 107 that the user may have access to depending upon the location of the user. For example, if the user enters conference room A with user device 108, the location of the user can be determined as conference room A, and the mapping system 114 can determine all the building systems 107 available to the user in conference room A in a building systems list 140. The building systems list 140 may then be displayed upon the user interface 154 of the user device 108 through application 155, and the user may select a building system 107 to control or provide feedback about on the building systems list 140 through the application 155.

The building systems 107 may include one or more individual controlled building systems including but not limited to lights, air temperature, air quality ($CO_2$ level), humidity, noise level, blinds, etc. The building systems 107 are controlled by a corresponding instance of control device 106 based on control settings from building automation system 104, which can also be set/overridden by feedback from the user device 108. In one example, the feedback may be a change request from a user based on a user-initiated action to dim the lights, and thus the building system 107 may dim the lights in the location of the user. Adjustments to control devices 106 may include but is not limited to turning lights on/off, adjusting the strength of lights, adjusting the color of lights, increasing/decreasing the temperatures, opening/closing the blinds, increasing/reducing humidity levels, increasing/reducing fresh air intake levels, increasing/reducing noise levels (e.g., white noise generator or active noise cancellation), etc. The combination of multiple settings of the building systems 107 at a same location can be referred to as the scene.

In embodiments, the weighted preference processing system 110 learns user preferences for a plurality of users of user devices 108 and stores indoor environmental user preferences in an occupant indoor environmental setting preference database 120. The contents of the occupant indoor environmental setting preference database 120 may be accessible by the building automation system 104 to make automated adjustments to the control devices 106 based on data from mapping system 114 and/or positioning system 112 that identifies current location information for a plurality of users in the building 102. The building automation system 104 and/or the weighted preference processing system 110 can also determine one or more relationships between an event history and location data of the users based on the occupant indoor environmental setting preferences in the occupant indoor environmental setting preference database 120. Relationships can include various groupings of user with similar preferences, locations identified as having higher levels of feedback, time-of-day/time-of-year trends, occupancy patterns with respect to indoor environmental settings, and the like. The relationships can be summarized and output for further direct and/or indirect use, such as predictive adjustments by the building automation system 104, maintenance/service requests for the building systems 107, and/or other actions. In embodiments, the weighted preference processing system 110 determines one or more weighted set points for at least one building system 107 operable to adjust an indoor environment at a location based on the occupant indoor environmental setting preferences extracted from the occupant indoor environmental setting preference database 120 for users as weighted with respect to the complaint history of the users, and/or other factors such as a staying time (e.g., a block of time at a same location) of each user at the location. The building automation system 104 can use the one or more weighted set points to adjust at least one control device 106 of at least one corresponding building system 107.

Figure 2:
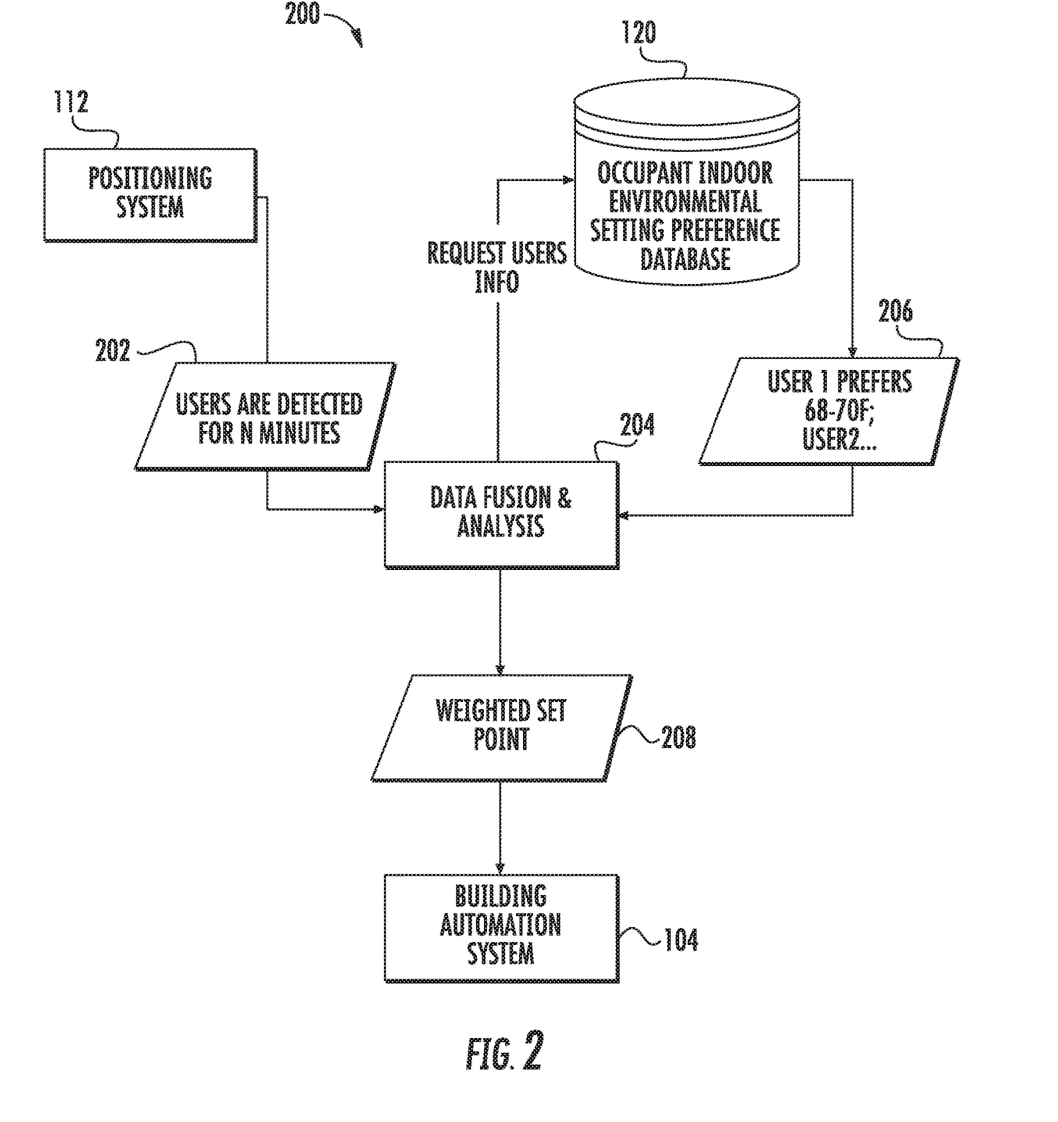
FIG. 2 depicts a block diagram of indoor environmental weighted preference processing, according to an embodiment of the present disclosure.

Referring now to FIG. 2, while referencing components of FIG. 1, FIG. 2 depicts a block diagram of indoor environmental weighted preference processing 200 according to an embodiment. The indoor environmental weighted preference processing 200 can be performed by the weighted preference processing system 110. The positioning system 112, and/or mapping system 114 can provide a list of users 202 detected at a location for a minimum period of time (e.g., 5-15 minutes) to data fusion and analysis 204. The data fusion and analysis 204 can access the occupant indoor environmental setting preference database 120 to request user information corresponding to the list of users 202. The data fusion and analysis 204 can receive occupant indoor environmental setting preferences 206 from the occupant indoor environmental setting preference database 120 as a plurality of preference records for the list of users 202. The data fusion and analysis 204 can determine one or more weighting based on the occupant indoor environmental setting preferences 206 and, for example, staying time of each of the users at the location to determine one or more weighted set points 208 for the building automation system 104. As one example, the data fusion and analysis 204 can apply equations 1 and 2 to determine a value of the one or more weighted set points 208, where a first weighting factor (a) is applied based on the staying time, and a second weighting factor (b) is applied based on the complaint history captured in the occupant indoor environmental setting preferences 206 for n users. Equations 1 and 2 can be applied for each type of environmental condition capable of being controlled at the location. In some embodiments, the first and second weighting factors (a) and (b) are shared for all types of environmental controls for the location (e.g., complaint data is combined). In other embodiments, complaint types are analyzed to produce different weightings per environment control type, for instance, differences in temperature complaints vs. humidity complaints result in different weights ($W_i$) for temperature vs. humidity controls. The calculated set point can be rounded at a pre-determined accuracy level towards the user's preference with the largest weighting factor. For example, if an accuracy level of 0.5° F. is defined for a comfort control system, the preferred set point for a space occupied by multiple users is calculated as 72.1° F., if the user with highest weighting factor prefers warmer temperature setting such as 73° F., the final set point can be rounded to 72.5° F.

$$W_i = a * \frac{\text{staying time}(userID_i)}{\text{Max}(\text{staying time}(userID_i))} + b * \frac{\text{complaint count}(userID_i)}{\text{Max}(\text{complaint count}(userID_i))} \quad \text{(Equation 1)}$$

Where $a + b = 1$ $$\text{weighted set point} = \frac{\sum_{i=1}^{n} W_i * \text{Pref\_settings\_temp}(userID_i)}{\sum_{i=1}^{n} W_i} \quad \text{(Equation 2)}$$

Figure 3:
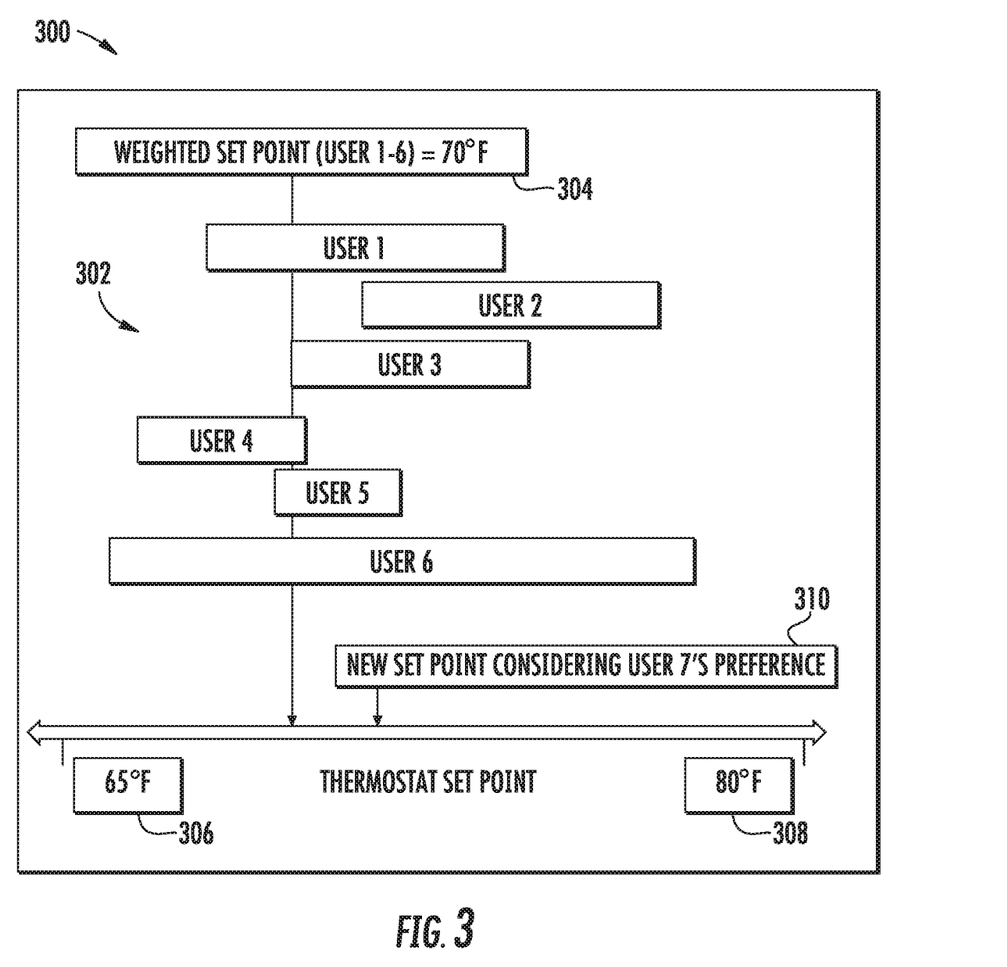
FIG. 3 depicts an example of user preference considerations for indoor environmental weighted preference processing, according to an embodiment of the present disclosure.

FIG. 3 depicts an example of user preference considerations 300 for indoor environmental weighted preference processing. A plurality of user data 302 for user1, user2, user3, user4, user5, and user6 is depicted in FIG. 3, where a greater width for user1-user6 indicates a greater staying time at a same location. A weighted set point 304 for temperature preferences as weighted with respect to user1-user6 can be established between a minimum set point 306 and a maximum set point 308. When a new user (user7) is detected at the location for a period of time that exceeds a pre-defined minimum staying time, a new set point 310 can be determined that accounts for the occupant indoor environmental setting preferences of user1-user6 and user7. If user7 has a substantial number of complaints, e.g., preferring a much warmer temperature, the addition of user7 at the location can result in the new set point 310 being set higher than the weighted set point 304 even though user7 has a lower staying time than user1-user6.

Figure 4:
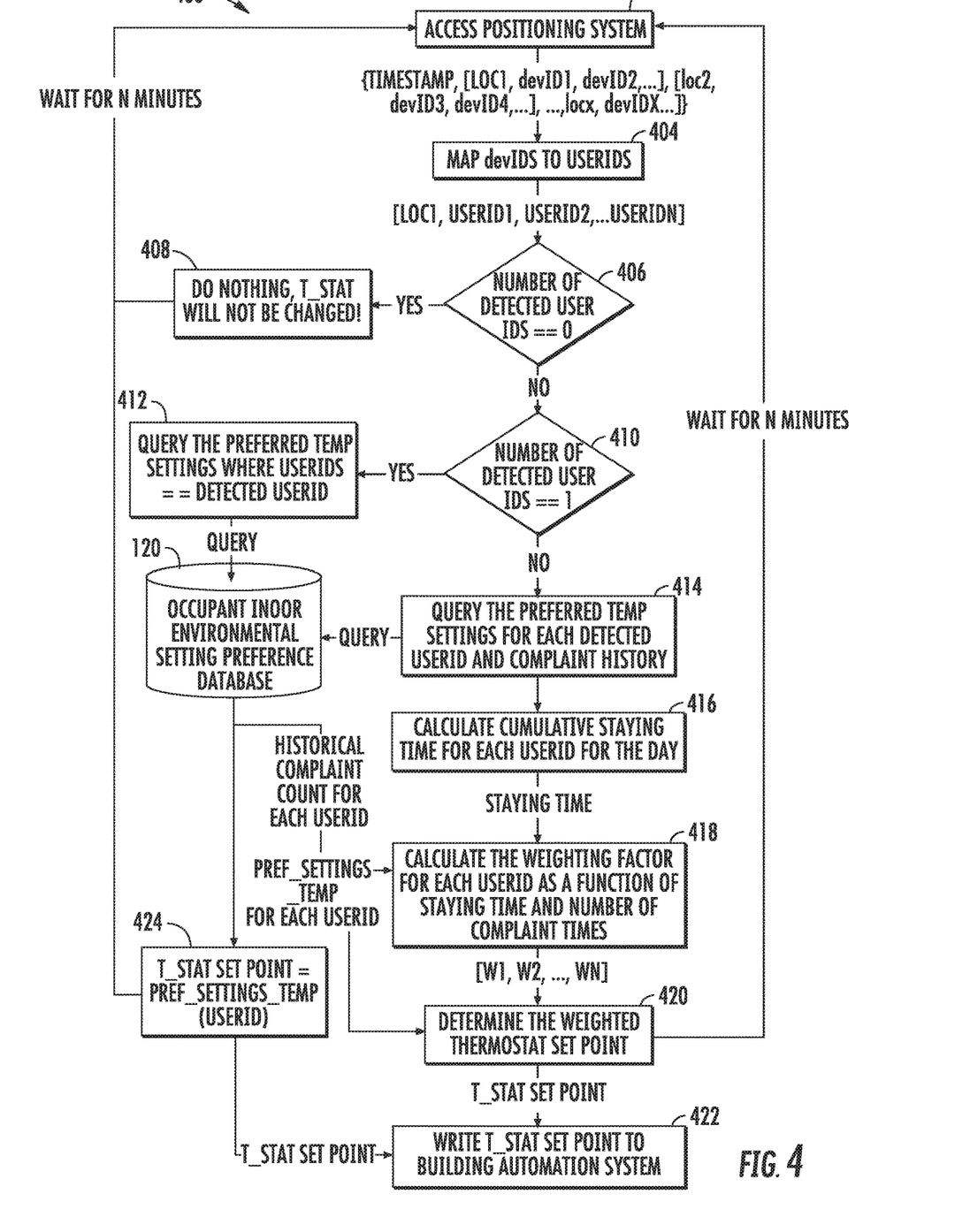
FIG. 4 depicts a process for weighted temperature preference management, according to an embodiment of the present disclosure.

FIG. 4 shows a flow chart of a method 400 of weighted temperature preference management for controlling space temperature or other environmental conditions at a location in the building 102 of FIG. 1, in accordance with an embodiment of the disclosure. The method 400 is described in reference to FIGS. 1-4 and can include additional steps beyond those depicted in FIG. 4. The method 400 can be performed by the weighted preference processing system 110 of FIG. 1. Although FIG. 4 shows the method 400 is set up to run periodically to check the occupants and determine the set point, method 400 can also be driven by occupant entry/exit events, meaning the method 400 is used when an occupant enters or leaves the location.

At block 402, the positioning system 112 is accessed 402 to identify user devices 108 at each of one or more locations in building 102 along with a timestamp. Device identifiers of the user devices 108 can be mapped 404 to user identifiers to form the list of users 202 at a location. At block 406, if the number of detected user identifiers is zero (i.e., the location is unoccupied by any of the users), then at block 408, the temperature and/or humidity or other indoor environmental set point can remain unchanged, which can be equivalent to setting/maintaining the one or more weighted set points 208 to a default value/values. Default values can be fixed based on factors such as time of year (e.g., winter default set point or summer default set point) or default values can be predicted based on preferences of a group of occupants that regularly use the location. If the number of detected user identifiers is not zero at block 406, then block 410 determines if the number of detected user identifiers is one. If the number of detected user identifiers is one, then at block 412, the occupant indoor environmental setting preference database 120 is queried for a single user. Otherwise, at block 414, the occupant indoor environmental setting preference database 120 is queried for the occupant indoor environmental setting preferences 206 including an associated complaint history for the users in the list of users 202. At block 416, the cumulative staying time can be calculated for each user. At block 418, a weighting factor can be calculated for each user as a function of the staying time and number of complaints extracted from the occupant indoor environmental setting preference database 120. At block 420, a weighted thermostat set point can be determined, for instance, according to equations 1 and 2. The weighted thermostat set point can be sent to the building automation system 104 at block 422 to control operation of a HVAC system to satisfy the one or more weighted set points 208. Alternatively, if there is only a single user at the location, then at block 424, the weighted thermostat set point can be set to match the occupant indoor environmental setting preferences for the single user and provided to the building automation system 104 at block 422.

Figure 5:
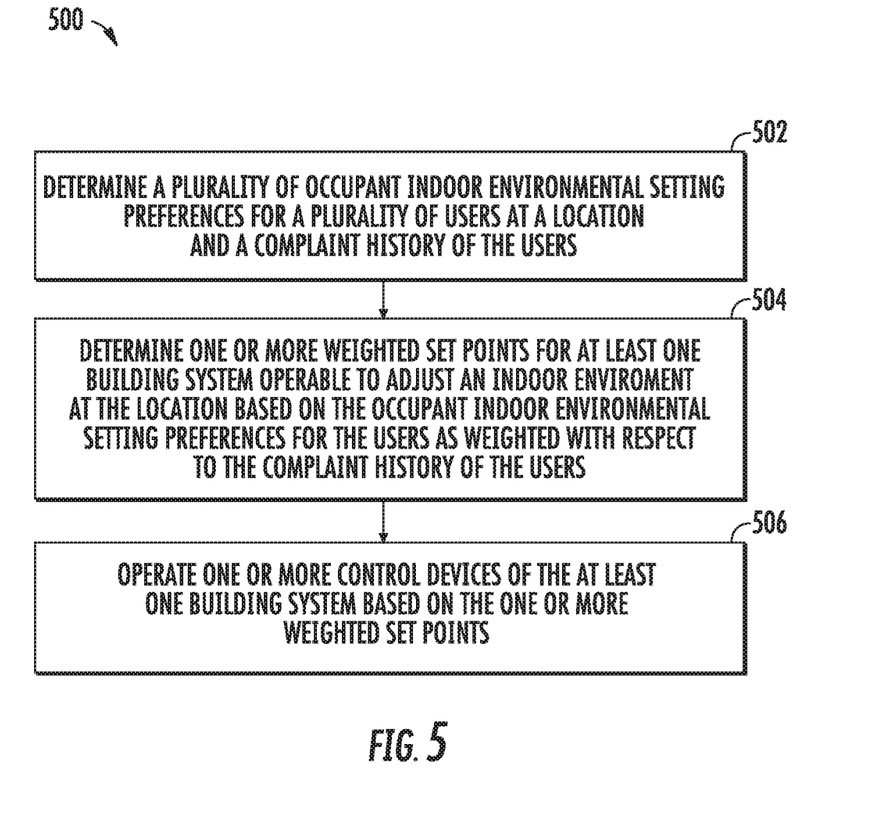
FIG. 5 depicts a process for indoor environmental weighted preference management, according to an embodiment of the present disclosure.

FIG. 5 shows a flow chart of a method 500 of indoor environmental weighted preference management for controlling a plurality of building systems 107 of FIG. 1, in accordance with an embodiment of the disclosure. The method 500 is described in reference to FIGS. 1-5 and can include additional steps beyond those depicted in FIG. 5. The method 500 can be applied to any number of building systems 107, such as lights, air temperature, air quality ($CO_2$ level), humidity, noise level, blinds, and the like. The method 500 is a generalized process of determining and applying one or more weighted set points 208 for many types of control devices 106 in contrast to the more detailed example in the method 400 of FIG. 4.

At block 502, a processor 170 of weighted preference processing system 110 determines a plurality of occupant indoor environmental setting preferences 206 for a plurality of users at a location and a complaint history of the users based on values read from the occupant indoor environmental setting preference database 120. The weighted preference processing system 110 can use data from the positioning system 112, and/or mapping system 114 to determine the location of the users. The occupant indoor environmental setting preference database 120 can include records of occupant indoor environmental setting preferences 206 for a plurality of users at a plurality of locations. Occupant indoor environmental setting preferences 206 can be recorded in occupant indoor environmental setting preference database 120 with respect to time of day and/or time of year based on user feedback. User feedback can be collected from various types of input, including one or more complaints associated with indoor environmental conditions at the location. Along with user position information, the weighted preference processing system 110 can also track staying time of each of the users at the location.

At block 504, the processor 170 of weighted preference processing system 110 determines one or more weighted set points 208 for at least one building system 107 operable to adjust an indoor environment at the location based on the occupant indoor environmental setting preferences 206 for the users as weighted with respect to the complaint history of the users. Each weighted set point of the one or more weighted set points 208 represents a blending of preferences of one or more users for a particular environmental condition. Thus, each control device 106 can be operated according to a single weighted set point of the one or more weighted set points 208 at a given time. The one or more weighted set points 208 can also be determined as a function of the staying time of each of the users at the location. A first weighting factor can be applied based on the staying time, and a second weighting factor can be applied based on the complaint history for each of the users staying at the location longer than a pre-defined minimum staying time. A greater weight can be applied to the occupant indoor environmental setting preferences 206 of the users having a longer staying time and to the users having a greater number of complaints as compared to other users at the location in determining the one or more weighted set points 208. The determining of the one or more weighted set points 208 can be repeated at a predetermined interval of time, such as once every fifteen minutes, or the determining of the one or more weighted set points 208 can be repeated when an occupant entry event or an occupant exit event is detected at the location. The one or more weighted set points 208 can be adjusted to match the occupant indoor environmental setting preferences 206 for a single user based on determining that only a single user is at the location. The one or more weighted set points 208 can be set to a default value/values based on determining that the location is unoccupied by any of the users. The default settings can be selected based on predetermined values for time of day and/or time of year. For instance, a default setting for temperature may be 70 degrees F. in the winter and 74 degrees F. in the summer during occupied hours.

At block 506, the one or more weighted set points 208 are provided to the building automation system 104, and one or more control devices 106 of the at least one building system 107 are operated based on the one or more weighted set points 208. Each control device 106 for the location can receive one of the one or more weighted set points 208 to adjust a corresponding building system 107, such as heating, cooling, humidity, illuminance, and the like.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of indoor environmental weighted preference management, the method comprising:
    determining, by a processor of a weighted preference processing system, a plurality of occupant indoor environmental setting preferences for a plurality of users at a location and a complaint history of the users;
    determining a staying time of each of the users at the location;
    determining, by the processor of the weighted preference processing system, one or more weighted set points for at least one building system operable to adjust an indoor environment at the location based on the occupant indoor environmental setting preferences for the users as weighted with respect to the complaint history of the users and as a function of the staying time of each of the users at the location, wherein a first weighting factor is applied based on the staying time and a second weighting factor is applied based on the complaint history for each of the users staying at the location longer than a pre-defined minimum staying time, and a greater weight is applied to the occupant indoor environmental setting preferences of the users having a longer staying time and to the users having a greater number of complaints as compared to other users at the location and scaled relative to a longest staying time and a largest number of complaints of the users at the location in determining each weighted set point of the one or more weighted set points;
    wherein each weight used to determine the one or more weighted set points is determined based on a first ratio of the staying time of each of the users to a maximum staying time at the location, a second ratio of the number of complaints for each of the users at the location to a maximum number of complaints, and adding the first ratio scaled by the first weighting factor with the second ratio scaled by the second weighting factor; and
    operating one or more control devices of the at east one building system based on the one or more weighted set points.

2. The method of claim 1, further comprising:
    accessing a positioning system to determine the position of the users at the location.

3. The method of claim 1, further comprising:
    repeating the determining of the one or more weighted set points at a predetermined interval of time, or repeating the determining of the one or more weighted set points when an occupant entry event or an occupant exit event is detected at the location.

4. The method of claim 1, further comprising:
    providing the one or more weighted set points to a building automation system.

5. The method of claim 1, further comprising:
    adjusting the one or more weighted set points to match the occupant indoor environmental setting preferences for a single user based on determining that only the single user is at the location.

6. The method of claim 1, further comprising:
    setting each of the one or more weighted set points to a default value based on determining that the location is unoccupied by any of the users.

7. The method of claim 1, wherein the first weighting factor and the second weighting factor are scaled with respect to each other.

8. A weighted preference processing system for indoor environmental weighted preference management, the weighted preference processing system comprising:
    a processor;
    a memory comprising computer-executable instructions that, when executed by the processor, cause the processor to perform operations, the operations comprising:
    determining a plurality of occupant indoor environmental setting preferences fora plurality of users at a location and a complaint history of the users;
    determining a staying time of each of the users at the location;
    determining one or more weighted set points for at least one building system operable to adjust an indoor environment at the location based on the occupant indoor environmental setting preferences for the users as weighted with respect to the complaint history of the users and as a function of the staying time of each of the users at the location, wherein a first weighting factor is applied based on the staying time and a second weighting factor is applied based on the complaint history for each of the users staying at the location longer than a pre-defined minimum staying time, and a greater weight is applied to the occupant indoor environmental setting preferences of the users having a longer staying time and to the users having a greater number of complaints as compared to other users at the location and scaled relative to a longest staying time and a largest number of complaints of the users at the location in determining each weighted set point of the one or more weighted set points;

wherein each weight used to determine the one or more weighted set points is determined based on a first ratio of the staying time of each of the users to a maximum staying time at the location, a second ratio of the number of complaints for each of the users at the location to a maximum number of complaints; and adding the first ratio scaled by the first weighting factor with the second ratio scaled by the second weighting factor; and operating one or more control devices of the at least one building system based on the one or more weighted set points.

9. The weighted preference processing system of claim 8, wherein the operations further comprise:

accessing a positioning system to determine the position of the users at the location.

10. The weighted preference processing system of claim 8, wherein the operations further comprise:

repeating the determining of the one or more weighted set points at a predetermined interval of time, or repeating the determining of the one or more weighted set points when an occupant entry event or an occupant exit event is detected at the location.

11. The weighted preference processing system of claim 8, wherein the operations further comprise:

providing the one or more weighted set points to a building automation system.

12. The weighted preference processing system of claim 8, wherein the operations further comprise:

adjusting the one or more weighted set points to match the occupant indoor environmental setting preferences for a single user based on determining that only the single user is at the location.

13. The weighted preference processing system of claim 8, wherein the operations further comprise:

setting each of the one or more weighted set points to a default value based on determining that the location is unoccupied by any of the users.

14. The weighted preference processing system of claim 8, wherein the first weighting factor and the second weighting factor are scaled with respect to each other.

* * * * *